United States Patent
Ward

(10) Patent No.: US 7,068,047 B2
(45) Date of Patent: Jun. 27, 2006

(54) RESIDUAL CURRENT DETECTION CIRCUIT

(75) Inventor: Patrick Ward, County Galway (IE)

(73) Assignee: Shakira Limited, County Galway (IE)

( * ) Notice: Subject to any disclaimer, the term of this patent is extended or adjusted under 35 U.S.C. 154(b) by 0 days.

(21) Appl. No.: 10/518,508

(22) PCT Filed: Mar. 25, 2003

(86) PCT No.: PCT/IE03/00047

§ 371 (c)(1),
(2), (4) Date: Dec. 21, 2004

(87) PCT Pub. No.: WO04/001924

PCT Pub. Date: Dec. 31, 2003

(65) Prior Publication Data

US 2005/0201026 A1    Sep. 15, 2005

(30) Foreign Application Priority Data

Jun. 24, 2002   (IE) ................................. 2002/0512

(51) Int. Cl.
G01R 27/02   (2006.01)
H02H 3/00   (2006.01)
(52) U.S. Cl. ........................................ 324/606; 361/42
(58) Field of Classification Search ................ 324/606; 361/75, 91.3, 83
See application file for complete search history.

(56) References Cited

U.S. PATENT DOCUMENTS

| | | | | |
|---|---|---|---|---|
| 4,347,541 A | * | 8/1982 | Chen et al. ................... | 361/50 |
| 4,725,913 A | * | 2/1988 | Dhar ........................... | 361/44 |
| 5,388,022 A | * | 2/1995 | Ahuja ......................... | 361/94 |
| 5,600,523 A | * | 2/1997 | Park ............................ | 361/42 |
| 5,856,902 A | * | 1/1999 | Hashimoto et al. ........... | 361/42 |
| 6,262,871 B1 | * | 7/2001 | Nemir et al. .................. | 361/42 |
| 6,650,516 B1 | * | 11/2003 | Langford et al. .............. | 361/42 |

* cited by examiner

Primary Examiner—Anjan Deb
Assistant Examiner—John Zhu
(74) Attorney, Agent, or Firm—Nath & Associates PLLC; Gregory B. Kang; Stanley N. Protigal

(57) ABSTRACT

A residual current detection circuit comprises a current transformer CT for detecting an imbalance current indicative of a residual current and a full wave restifier FWR for providing an output whose amplitude corresponds to the magnitude of the residual current. The FWR output is applied simultaneously to two channels. The first channel includes a first comparator COMP1 to provide a first signal which persists during periods when the amplitude of the output exceeds a first level. The second channel includes a capacitor C2 which acquires a charge corresponding to the output level and a second comparator COMP2 for providing a second signal in response to the capacitor voltage exceeding a second level. An output is provided from the circuit only when the first signal is coincident with the second signal.

9 Claims, 6 Drawing Sheets

-- Prior Art --

RESIDUAL CURRENT DETECTION CIRCUIT

Figure 1:
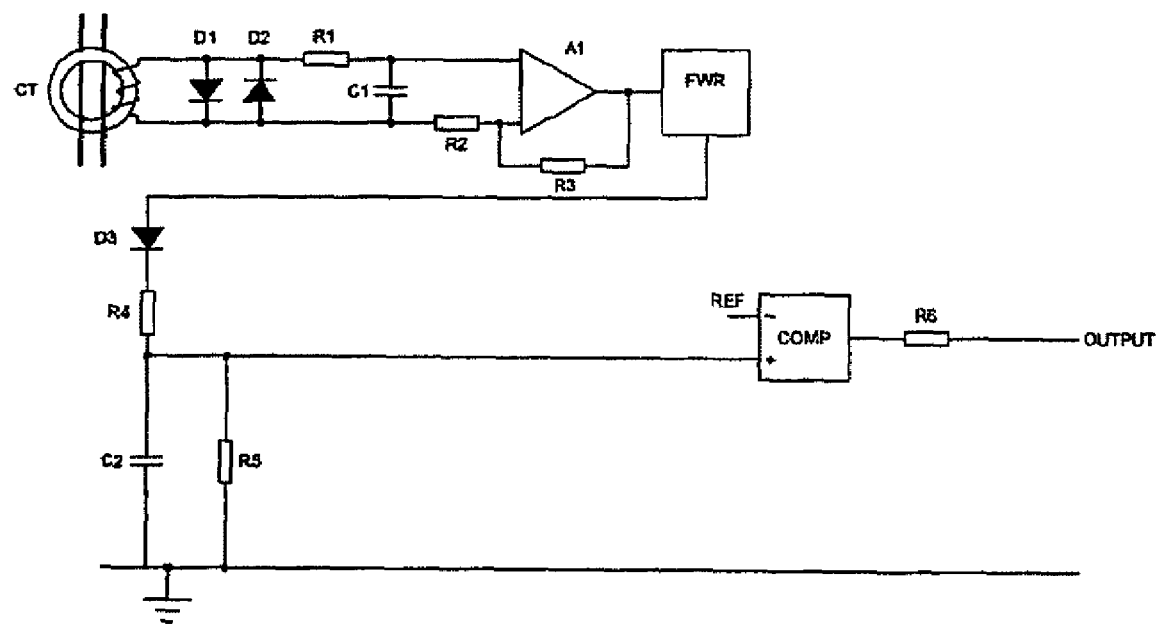

This invention relates to a residual current detection circuit for use in, for example, a residual current device (RCD).

BACKGROUND

The most common problem associated with RCDs is that of nuisance tripping, and in the majority of cases this is due to the RCD tripping in the absence of a sustained residual current above a predetermined level. As used herein, the term "sustained residual current" refers to any residual current which continues to flow until it is interrupted by removal of power, whereas "non sustained residual current" refers to any current which automatically ceases to flow after an initial surge or impulse. A non sustained residual current can flow to earth in response to lightning surges, switching of reactive loads or momentary current flows to earth which are not attributable to insulation breakdown and therefore not sustained. Nonetheless, in many cases such currents will be perceived by the RCD as a residual current of sufficient magnitude and duration such as to cause the RCD to trip.

For reasons of safety and optimum protection, many RCDs have an inverse time/current characteristic which causes the RCD to trip faster for higher magnitude residual currents. However, this characteristic may predispose the RCD to trip automatically in response to the flow of residual currents of high magnitude but short duration. In the case of lightning surges, the resultant current flow to earth can have a magnitude in the amperes region, and although such currents may flow for only a period of a few microseconds, the RCD may unavoidably trip. The nuisance tripping problem has recently been compounded by the use of electronic starters in fluorescent lights where an ignition current of hundreds of amperes with a duration of a few milliseconds can result in the flow of relatively large capacitive currents to earth for a similar period. Conventional RCDs have little immunity to such currents and are highly likely to nuisance trip.

RCD designers have tried various means to make their products immune to such problems, such as the addition of mechanical slugging and time delay circuitry. However, the amount of slugging or time delay that can be added to an RCD is limited because of a requirement to trip within specified time limits for different magnitude fault currents. Typically, a general type 30 mA RCD complying with RCD product standard IEC61008 will have to trip within 300 mS for a residual current of 30 mA and within 40 mS for a residual current of 150 mA or higher. This type of response to higher magnitude residual currents provides the inverse time/current characteristic. Excessive slugging or time delay will make it impossible for the RCD to meet the 40 mS requirement, so the effectiveness of such improvements is limited.

In addition, the use of electronic circuitry to achieve a time delay often results in the storage of charge in reactive components which can have the effect of stretching the duration of the signal as seen by the electronic circuitry. In effect, because of the large magnitude of the residual current, the resultant accumulative storage effect in reactive components will cause the RCD to perceive a residual current flow of a substantially longer period than the actual period of residual current flow.

SUMMARY

It is an object of the present invention to provide an improved residual current detection-circuit for use, for example, in an RCD, in which these problems are overcome or substantially reduced.

Accordingly, the invention provides a residual current detection circuit comprising means for detecting an imbalance current indidative of a residual current and providing an output whose amplitude corresponds to the magnitude of the residual current; the output being applied simultaneously to two channels wherein the first channel provides a first signal and the second channel provides a second signal which is time delayed with respect to the first signal, the output of each channel being applied to a circuit stage which produces an output only when the first and second signals are coincident at its input.

A preferred embodiment of the invention provides a residual current detection circuit comprising means for detecting an imbalance current indicative of a residual current and providing an output whose amplitude corresponds to the magnitude of the residual current, the output being applied simultaneously to two channels wherein the first channel includes means for providing a first signal when the amplitude of the output exceeds a first level, and wherein the second channel includes a capacitor which acquires a charge corresponding to the amplitude of the output and means for providing a second signal in response to the voltage on the capacitor exceeding a second level, the circuit further including means for providing an output signal only when the first signal is coincident with the second signal.

The first and second levels may be the same or different. Also, according to context, a signal may be provided by any distinguishable state of a device; for example, a change in voltage level or the absence of a voltage where previously there was one.

Embodiments of the invention will now be described, by way of example, with reference to the accompanying drawings, wherein:

FIG. 1 is a circuit diagram of a prior art residual current detection circuit for use in an RCD; and FIGS. 2 to 6 are embodiments of residual current detection circuits according to the invention.

DETAILED DESCRIPTION

An earth leakage (residual) current is conventionally detected using a current transformer (CT) surrounding the mains conductors. The residual current seen by the CT can be full wave, or partial wave in the form of pulsating DC which may flow for a short period during the positive or negative half cycles of the AC mains supply when power is controlled by rectifiers or thyristors, etc. Pulsating DC currents can be as dangerous as full wave currents, and although they may flow for only a short period during alternative half cycles, it would be important for the RCD circuit to detect such residual currents. A full wave residual current could be considered to be continuous whereas a pulsating DC residual current could be considered to be recurring because of the relatively long non-conduction period between pulses.

FIG. 1 shows a basic residual current detection circuit which is powered from a DC or rectified AC voltage. In conventional manner, AC mains live and neutral conductors connected to a load pass through a current transformer CT and any residual current in these conductors, which is indicative of an earth fault current, is detected by the CT to produce an output voltage in proportion to the magnitude of the residual current. Diodes D1 and D2 clamp the CT output voltage to positive and negative limits to prevent the electronic circuitry from being damaged by excessive voltage excursions and resistor R1 and capacitor C1 filter out high frequencies from the CT output voltage. After limiting and filtering, the CT output voltage is applied to an amplifier A1 whose gain is set by R2 and R3. The output of A1 is fed to a full wave rectifier stage FWR to convert the AC voltage to a unipolar voltage. Thus, for any residual current the output of FWR is a series of positive polarity voltage pulses at double the mains frequency, e.g. 100 Hz in the case of a 50 z mains, and having an amplitude corresponding to the magnitude of the residual current.

The FWR output is fed via a diode D3 and a resistor R4 to charge a capacitor C2. Resistor R5 is a bleed resistor which prevents C2 from holding its charge indefinitely. The values of these components are chosen such that C2 charges up via D3/R4 at a faster rate than it discharges via R5, the charging and discharging rates being determined by the values of R4 and R5 respectively for a given FWR output voltage. Therefore, C2 effectively smoothes the FWR output such that the voltage on C2 is an average of the FWR output over a period substantially determined by the time constant C2/R5. The voltage on C2 is fed to an output stage (not shown) to operate a tripping mechanism. For the purpose of setting a tripping level or threshold, prior to the output stage the voltage on C2 may be compared in a comparator Comp to a threshold level Ref, so that an-output is only provided to the output stage if the voltage on C2 exceeds Ref. The basic circuit has the ability to detect and respond to AC and pulsating DC residual currents.

A key problem with the basic circuit of FIG. 1 is that capacitor C2 will acquire and store a charge in response to any output from the CT, including short duration impulses caused by noise or current surges, etc. Such impulses, although momentary and not attributable to an earth fault current, can often be of relatively large amplitude with the result that the charge on C2 will cause the output stage to be activated and thereby give rise to nuisance tripping.

Figure 2:
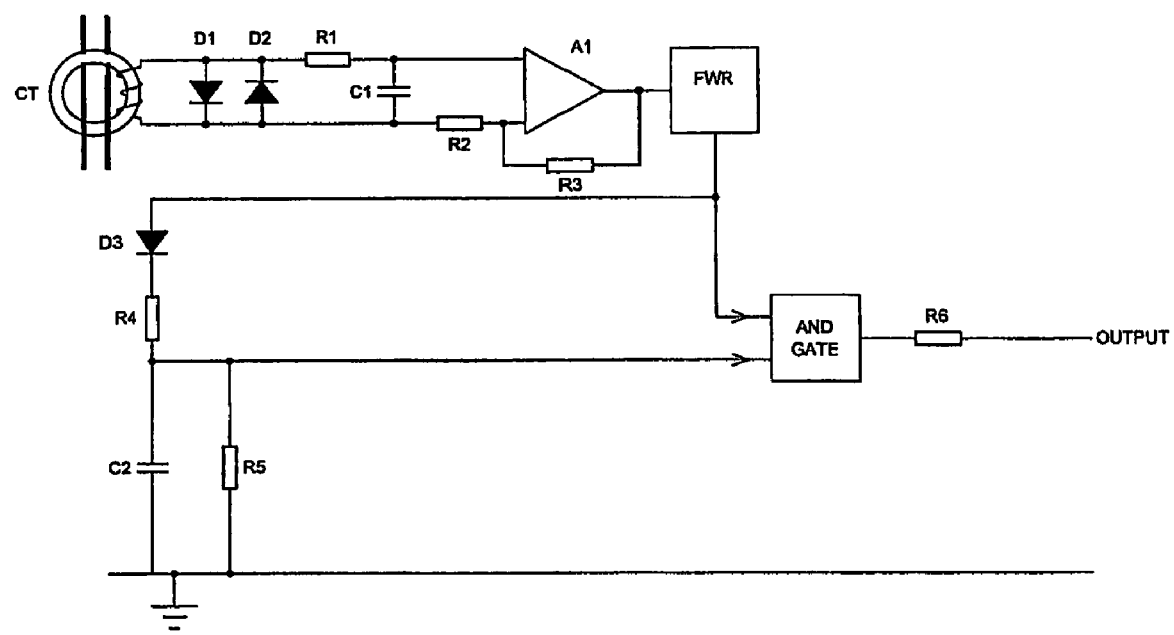

FIG. 2 shows an improved circuit which reduces the risk of nuisance tripping associated with short duration current impulses.

The FWR output voltage is supplied simultaneously to two channels. In the first channel the FWR output voltage is fed directly to a first input terminal of an AND gate. In the second channel the same FWR output voltage is also fed to C2 as before but the output of C2 is now fed to the second input terminal of the AND gate. Each input terminal of the AND gate has a predetermined threshold, which may be the same or different for each input terminal, so that at each input terminal an input signal to the AND gate will only be produced when the voltage at that terminal exceeds the respective threshold. Thus, the AND gate will only produce an output when the two input voltages are coincident and have levels above the respective AND gate input thresholds. The time taken by C2 to acquire a charge via R4 will introduce a delay in the voltage applied at the second input terminal of the AND gate compared to that applied at the first input terminal. Provided that the residual current producing the FWR output is recurring or sustained beyond the delay introduced by C2 and above a certain level, the AND gate will see two coincident signals from FWR and C2 respectively thereby producing an output and causing the RCD to trip. If the residual current producing the FWR output is not recurring or sustained beyond the delay introduced by C2, the first input signal to the AND gate will not be present when the second signal arrives from C2. As a result there will be no output from the AND gate and the RCD will not trip in response to a short duration impulse. C2 will discharge via R5 within a finite time if the FWR output is not recurring or sustained.

By taking the FWR output and using it to produce two separate signals the RCD has been given a high degree of immunity to nuisance tripping caused by short duration or unsustained residual currents.

Figure 3:
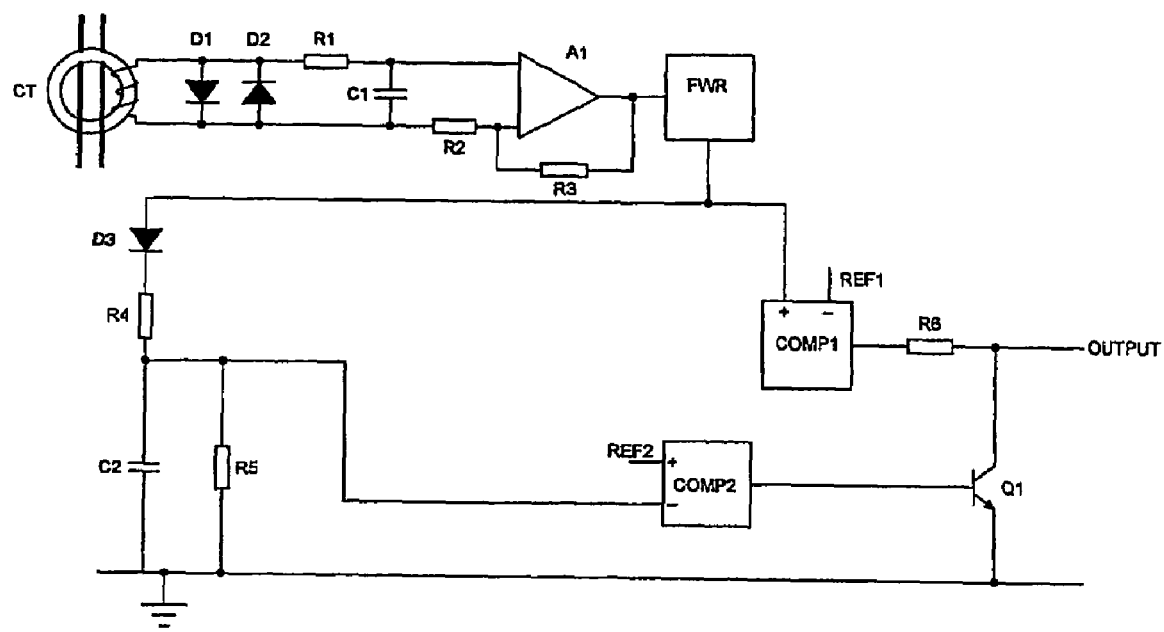

The circuit of FIG. 2 can be further improved as shown by FIG. 3. In this circuit the FWR output, which is a first signal, is now fed to the +ve terminal of a first comparator Comp1 whose –ve terminal is connected to a reference voltage Ref1. The FWR output is also fed to C2 as before to produce a second signal arising from the voltage on C2 but this signal is now fed to the –ve terminal of a second comparator Comp2 whose +ve terminal is connected to a reference voltage Ref2. Under quiescent conditions Comp2 output is high thereby holding a switching transistor Q1 turned on and maintaining a disabling clamp on the output of the circuit by holding it at ground level. When the voltage on C2 exceeds Ref2, Comp2 output goes low and turns off Q1 thereby removing the disabling clamp from the output. When the FWR output exceeds Ref1 level, Comp1 output goes high and whenever Q1 is turned off any high output from Comp1 will be fed to the output stage via R6.

Comp1 effectively converts FWR output into rectangular pulses of equal amplitude. Ref1 can be set at any convenient level which ensures that only FWR signals caused by residual currents above a certain threshold are converted into rectangular waves by Comp1. This ensures that background noise will have minimal effect on the performance of the RCD. In effect Comp1 will be responsive to the presence of any residual current above a certain threshold regardless of its actual amplitude whereas Comp2 will be responsive to residual currents which result in the charge on C2 exceeding a certain average DC level determined by Ref2.

The desired trip threshold of the RCD can be set by altering the gain of the amplifier by suitable selection of the values of R2 and R3, or by selection of Ref2, or a combination of these variables.

Figure 4:
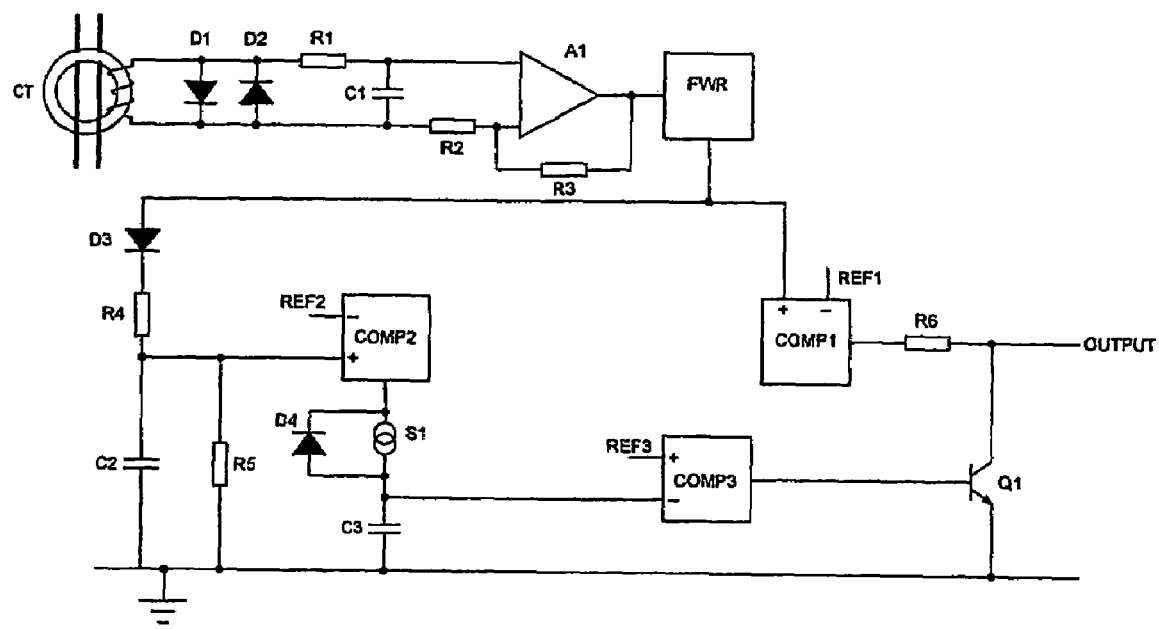
Figure 5:
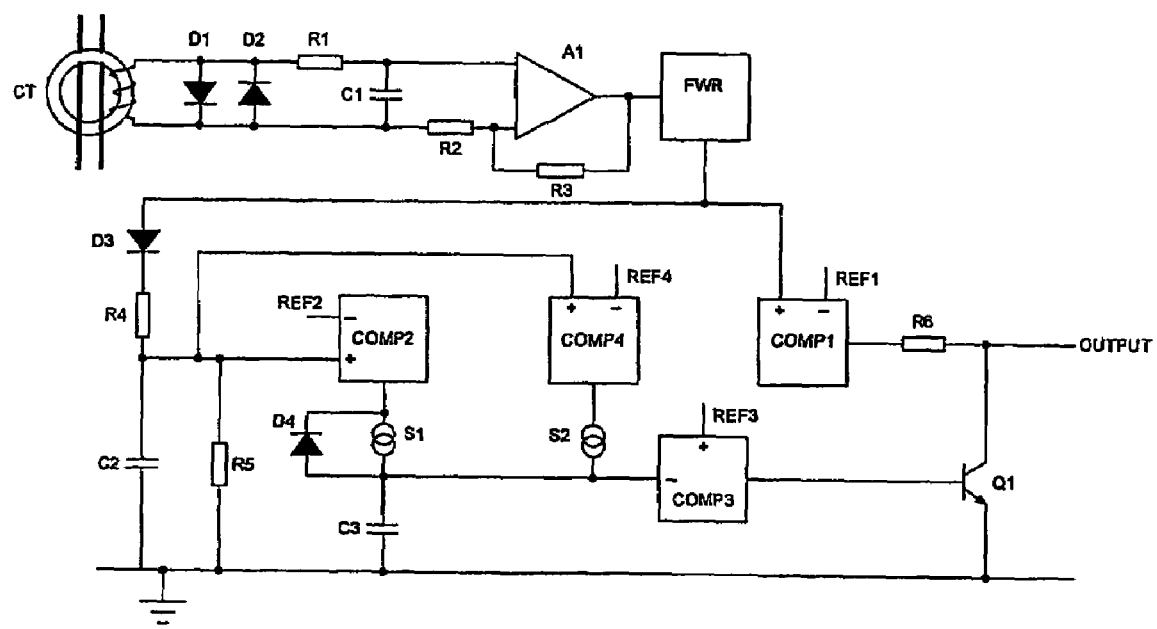

It is sometimes desirable for RCDs to have an assured non response time during which the RCD will not respond to a residual current regardless of its magnitude. This is a desirable feature which can provide a high degree of immunity to lightning surges or electronic starters for fluorescent lights which can result in residual currents in the range of amperes rather than the milliampere range where RCDs generally operate for shock protection. FIG. 4 shows a refinement of FIG. 3 which provides this capability.

In FIG. 4 the FWR output is applied to Comp1 and C2 as before. However, Comp2 is in this case connected to a current source S1 which, when enabled by an output from Comp2, charges up a capacitor C3. The voltage on C3 is applied to the –ve terminal of a third comparator Comp3 whose +ve terminal is connected to a reference voltage Ref3. When the voltage on C2 exceeds Ref2 level, Comp2 output goes high, enabling capacitor C3 to charge up at a predetermined rate from S1. When the voltage on C3 exceeds Ref3, Comp3 output goes low and removes a disabling clamp on the output as before, enabling the RCD to trip if the first signal is then present at the output of Comp1. The time taken for C3 to charge up is independent of the magnitude of the residual current. If the charge on C2 falls below Ref2 before the charge on C3 exceeds Ref3, Comp2 output will go low and C3 will be discharged via D4 thereby preventing the RCD from tripping. The circuit of FIG. 4 therefore has the ability to prevent the RCD from responding to a residual current for a finite period which in turn provides the RCD with an assured non response time whilst ensuring its response to sustained or recurring residual currents still flowing after that period.

As stated previously, the residual current level at which the RCD will trip is known as the trip threshold of the device. In the case of a sustained residual current which exceeds the trip threshold of the RCD, the circuit as described above will have a similar response time regardless of whether such currents are marginally or substantially above the threshold. In many cases users prefer the RCD to have an inverse time/current characteristic. The circuit of FIG. 5 can provide this capability by inclusion of a further comparator Comp4 and a second current source S2, the voltage on C2 being applied to the +ve terminal of Comp4 and a reference voltage Ref4 being supplied to the −ve terminal.

The reference voltage Ref4 is higher than Ref2. When the voltage from C2 exceeds Ref2, Comp2 allows C3 to acquire a charge at a predetermined rate from current source S1. However, if the voltage across C2 is higher than Ref4, Comp4 output will activate the second current source S2 and enable C3 to acquire its charge at a faster rate with the result that the RCD will respond faster to higher level residual currents. The inverse time/current response can be optimised by for example using additional current sources or by using different charging currents from the current sources, or by changing Ref4 voltage, or using one of more of the above as controlling means. Suitable selection of component values can provide for appropriate response times at various residual current levels whilst maintaining the basic high immunity of the circuit to nuisance tripping.

Figure 6:
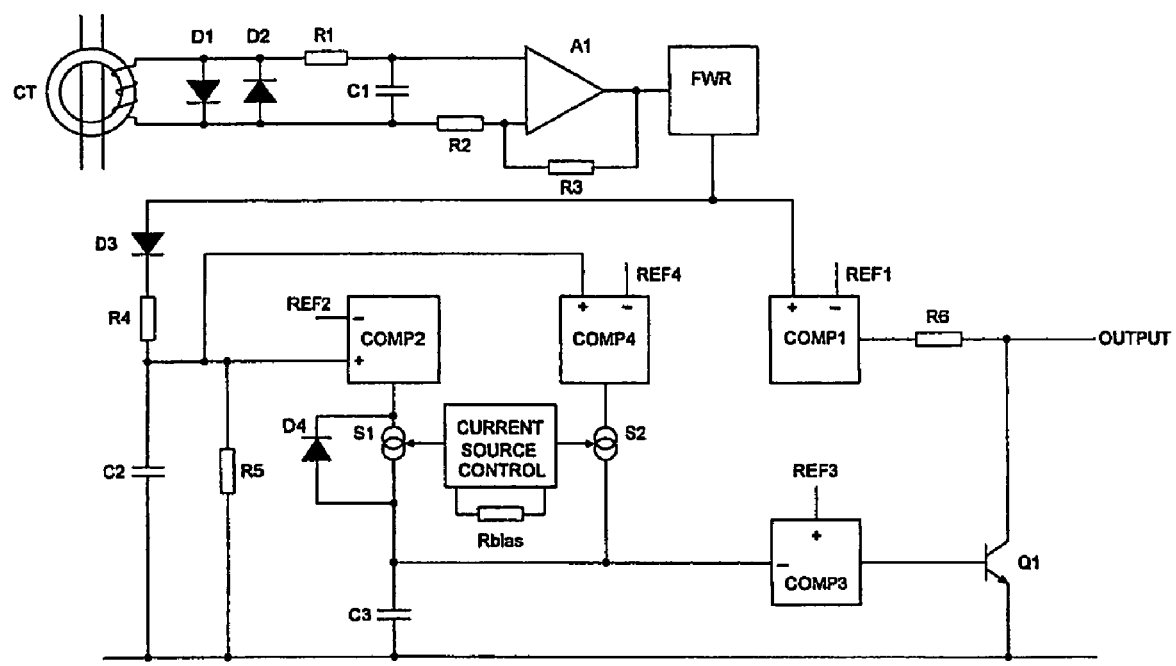

FIG. 6 provides an example of such controlling means. In FIG. 6, additional circuitry has been included to provide for adjustment and control of the level of current flowing from S1 and S2 current sources. Control is achieved by means of a bias resistor, Rbias, whose value sets the precise level of the source currents. A change in the value of Rbias will either increase or decrease the amount of current flowing from Si and S2 into C3, and thereby control its charging rate and the response time of the circuit for residual currents of different magnitudes.

Problems of nuisance tripping can also be caused by conducted or radiated frequency components extending from harmonics of the fundamental mains frequency to radio frequencies extending to the gigahertz range. Appropriate suppression techniques can be applied to the basic circuit to enhance its immunity to nuisance tripping in response to such interference without detracting from the basic embodiments described herein.

The invention is not limited to the embodiments described herein which may be modified or varied without departing from the scope of the invention.

The invention claimed is:

1. A residual current detection circuit comprising means for detecting an imbalance current indicative of a residual current and providing an output whose amplitude corresponds to the magnitude of the residual current, the output being applied simultaneously to two channels wherein the first channel provides a first signal while the amplitude of the output exceeds a predetermined level and the second channel provides a second signal, the first and second signals being applied to a circuit stage which produces an output only when the applied first and second signals are coincident, wherein the application of the second signal to the circuit stage is delayed with respect to the application of the first signal to the circuit stage whereby the circuit stage produces an output only if the duration of the first signal is greater than the delay in the application of the second signal.

2. A residual current detection circuit comprising means for detecting an imbalance current indicative of a residual current and providing an output whose amplitude corresponds to the magnitude of the residual current, the output being applied simultaneously to two channels wherein the first channel includes means for providing a first signal while the amplitude of the output exceeds a first level, and wherein the second channel includes a capacitor which acquires a charge corresponding to the amplitude of the output and means for providing a second signal in response to the voltage on the capacitor exceeding a second level, the circuit further including a circuit stage for providing an output signal only when the applied first and second signals are coincident, wherein the application of the second signal to the circuit stage is delayed with respect to the application of the first signal to the circuit stage whereby the output signal is provided by the circuit stage only if the duration of the first signal is greater than the delay in the application of the second signal.

3. A residual current detection circuit as claimed in claim 2, wherein the output of the detecting and providing means is a voltage, wherein the first channel connects the output voltage to a first input terminal of an AND gate, the first input terminal having a first threshold defining said first level whereby the first signal is applied to said AND gate when the output voltage exceeds the first threshold, and wherein the second channel connects the capacitor voltage to a second input terminal of the AND gate, the second input terminal having a second threshold defining said second level whereby the second signal is applied to said AND gate when the capacitor voltage exceeds the second threshold, the output signal being produced by the AND gate upon coincidence of the applied first and second signals.

4. A residual current detection circuit as claimed in claim 2, wherein the output of the detecting and providing means is a voltage, wherein the first channel includes a first comparator for comparing the output voltage with a first reference voltage and providing said first signal as output when the output voltage exceeds the first reference voltage, and wherein the second channel includes a second comparator for comparing the capacitor voltage with a second reference voltage and providing an output signal when the capacitor voltage exceeds the second reference voltage, the said second signal either being constituted by, or being derived from, the second comparator output signal.

5. A residual current detection circuit as claimed in claim 4, wherein the second channel further includes a current source which charges up a second capacitor upon the occurrence of a second comparator output signal and a third comparator for comparing the second capacitor voltage with a third reference voltage and providing an output signal when the second capacitor voltage exceeds the third reference voltage.

6. A residual current detection circuit as claimed in claim 5, wherein the second channel includes a fourth comparator for comparing the capacitor voltage with a fourth reference voltage higher than the second reference voltage and providing an output signal when the capacitor voltage exceeds the fourth reference voltage, wherein the second channel further includes a second current source which assists the first current source to charge up the second capacitor upon the occurrence of a fourth comparator output signal.

7. A residual current detection circuit as claimed in claim 5, further including means for adjusting the magnitude(s) of the current(s) supplied by the current source(s).

8. A residual current detection circuit as claimed in claim 5, wherein the third comparator output voltage constitutes the said second signal.

9. A residual current detection circuit as claimed in claim 4, wherein the means for providing an output signal only when the first signal is coincident with the second signal comprises a switching device which applies a disabling clamp to the output of the first comparator except during the occurrence of the second signal.

* * * * *